D. M. FRASER.
PIPE FITTING.
APPLICATION FILED APR. 21, 1916.
1,225,795.
Patented May 15, 1917.
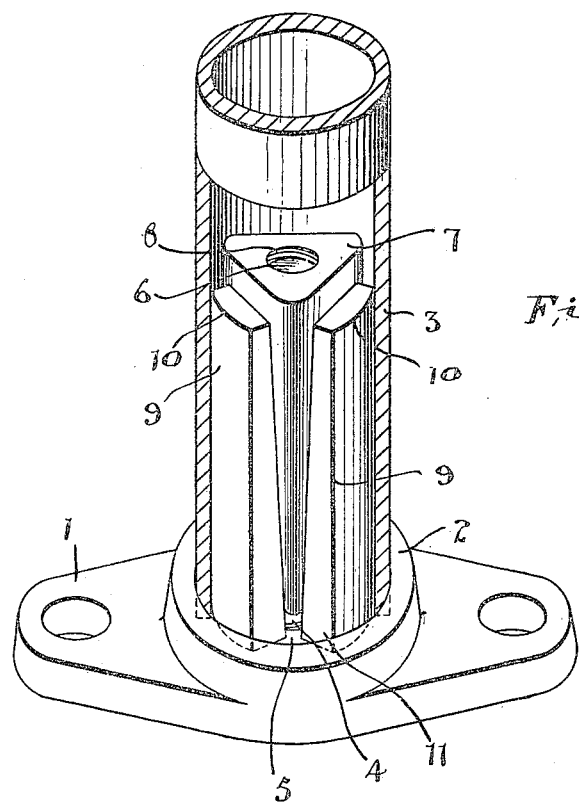
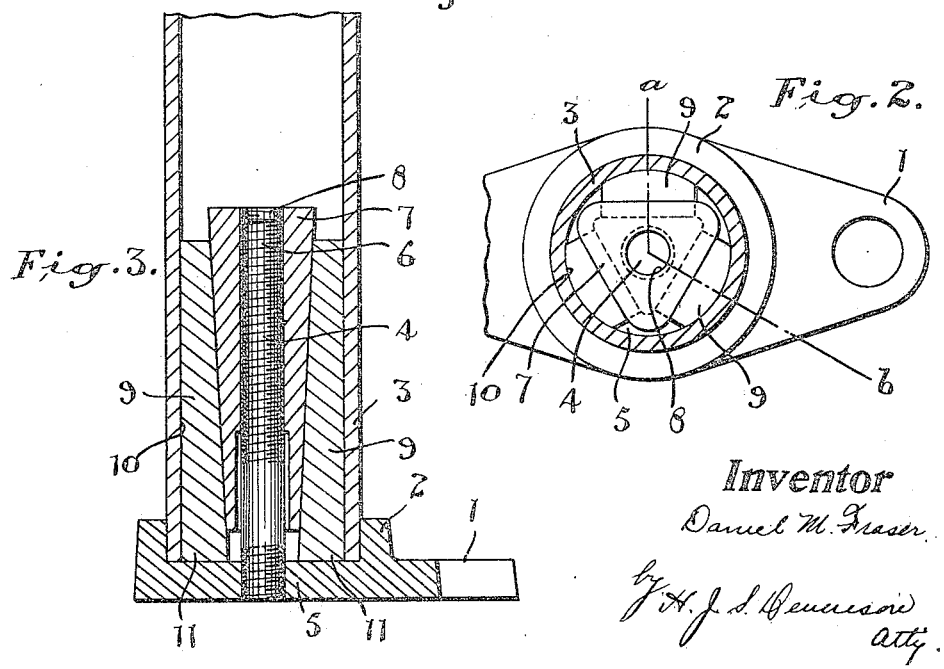
Inventor
Daniel M. Fraser
by H. J. S. Dennison
Atty.

UNITED STATES PATENT OFFICE.

DANIEL M. FRASER, OF TORONTO, ONTARIO, CANADA.

PIPE-FITTING.

1,225,795.

Specification of Letters Patent.　　Patented May 15, 1917.

Application filed April 21, 1916.　Serial No. 92,599.

*To all whom it may concern:*

Be it known that I, DANIEL M. FRASER, a subject of the King of Great Britain, and resident of the city of Toronto, county of York, Province of Ontario, in the Dominion of Canada, have invented certain new and useful Improvements in Pipe-Fittings, as described in the following specification and illustrated in the accompanying drawings, that form part of the same.

The principal objects of the invention are, to effect a substantial saving in the cost of erecting and installing hand rails and various other forms of supports in which pipe is used.

A further object is to eliminate the threading of the pipes and the consequent difficulties and weakening of the structures through the cutting away of the metal for the threads.

The principal feature of the invention consists in the novel construction of the pipe fitting and the expanding and gripping members, whereby the pipe is gripped and held securely to the fitting.

In the drawings, Figure 1 is a perspective view of a fitting constructed in accordance with this invention, showing the length of pipe secured thereby in longitudinal section.

Fig. 2 is a plan view of the fitting, the pipe being shown in cross section.

Fig. 3 is a vertical longitudinal section through the line *a—b* of Fig. 2.

Like numerals of reference indicate corresponding parts in each figure.

Referring to the drawings, 1 is a pipe fitting here shown in the form of a wall or floor flange. The fitting is provided with an annular projecting flange 2, the interior of which is adapted to receive a pipe 3 in an easy fit.

4 is a threaded stud secured in the base portion 5 of the fitting 1 in central relation to the flange 2 and extending outwardly beyond said flange having a threaded outer end 6.

7 is a wedge member, here shown of triangular form in cross section having a central circular hole 8 extending therethrough from end to end, said hole at the narrow end of said wedge being counterbored to a larger diameter than the stud and the outer portion being threaded to fit the threaded outer end 6 thereof.

9 are a plurality of wedges formed with flat inner sides adapted to engage the flat sides of the wedge 7 and having their outer sides 10 preferably curved to conform to the curve of the inner wall of the pipe 3. The wedges 7 and 9 are proportioned so that when the base ends 11 of the wedges 9 rest against the base 5 of the fitting 1, the small end of the wedge 7 will be spaced from the base of the fitting, thus allowing the central wedge to be drawn into close and tight engaging contact with the outer wedges so as to force the same into rigid engagement with the inner wall of the pipe and if necessary to slightly expand the same, thereby gripping the pipe securely.

In placing this fitting in position upon the end of a pipe or vice versa, the four wedges are placed together with the central wedge extended a sufficient distance to allow of the easy insertion of the group of wedges into the interior of the pipe. When they are thus placed in position the stud 4 is inserted and enters the counterbored portion of the hole 8 without difficulty and is guided into the threaded portion of the hole. The outer wedges spread outwardly to engage the inner wall of the pipe and the fitting is then rotated turning the stud in the central wedge to draw it tightly into position.

The flange 2 is preferably provided to rigidly support the end of the pipe and to relieve the stud of any lateral strain and also forms a proper finish for the joint.

In work where extreme rigidity and tightness is required the flange may be machined to fit quite snugly around the pipe and upon the tightening of the fitting the wedges will expand the pipe sufficiently to grip the inner wall of the flange very securely.

It will be understood from this description that any form of tubular support may be very rigidly secured in any desirable position by means of the present invention and the supporting member will not be weakened by the cutting away of any of the metal as by a thread. The difficulties in completing a particular arrangement of fittings ordinarily necessitating the use of right and left hand threads is also obviated.

It will be seen that with the use of a fitting such as described all the machine work at the place of erection is entirely eliminated. The fittings are faced and threaded and the studs inserted in quantities in the shops and it is then merely necessary to cut the pipe the desired length and insert the expanding wedges and secure it in place.

It will also be noted that the ordinary method of cutting pipes will not in any way interfere with the use of this device and is in fact rather an assistance as the inward bur caused by the cutting tool at the end of the pipe will hold the loose wedges from dropping out before the expander is drawn tightly into position.

The saving of time and labor in the erection of railings or other devices to which the invention is applied is quite obvious, as also is the reduction in the cost of manufacture of the parts as all parts of the fitting can be made from ordinary cast iron in lieu of the malleable iron fittings at present in use.

What I claim as my invention is:—

1. A pipe fitting comprising an anchoring member having a rigid threaded extension adapted to enter the end of the pipe, a wedge threaded on the said extension, and a plurality of wedge members adapted to engage the central wedge and the inner wall of the pipe.

2. A pipe fitting, comprising an anchoring member adapted to rotatably abut the end of the pipe and having an annular projecting flange adapted to encircle the pipe end, a stud rigidly secured in said anchor member, centrally in relation to said flange and having a threaded end, a wedge threaded on said stud, and wedges placed in the pipe and expanded into locking contact by said central wedge on the rotation of said anchor member.

DANIEL M. FRASER.

Copies of this patent may be obtained for five cents each, by addressing the "Commissioner of Patents, Washington, D. C."